Figure 1:
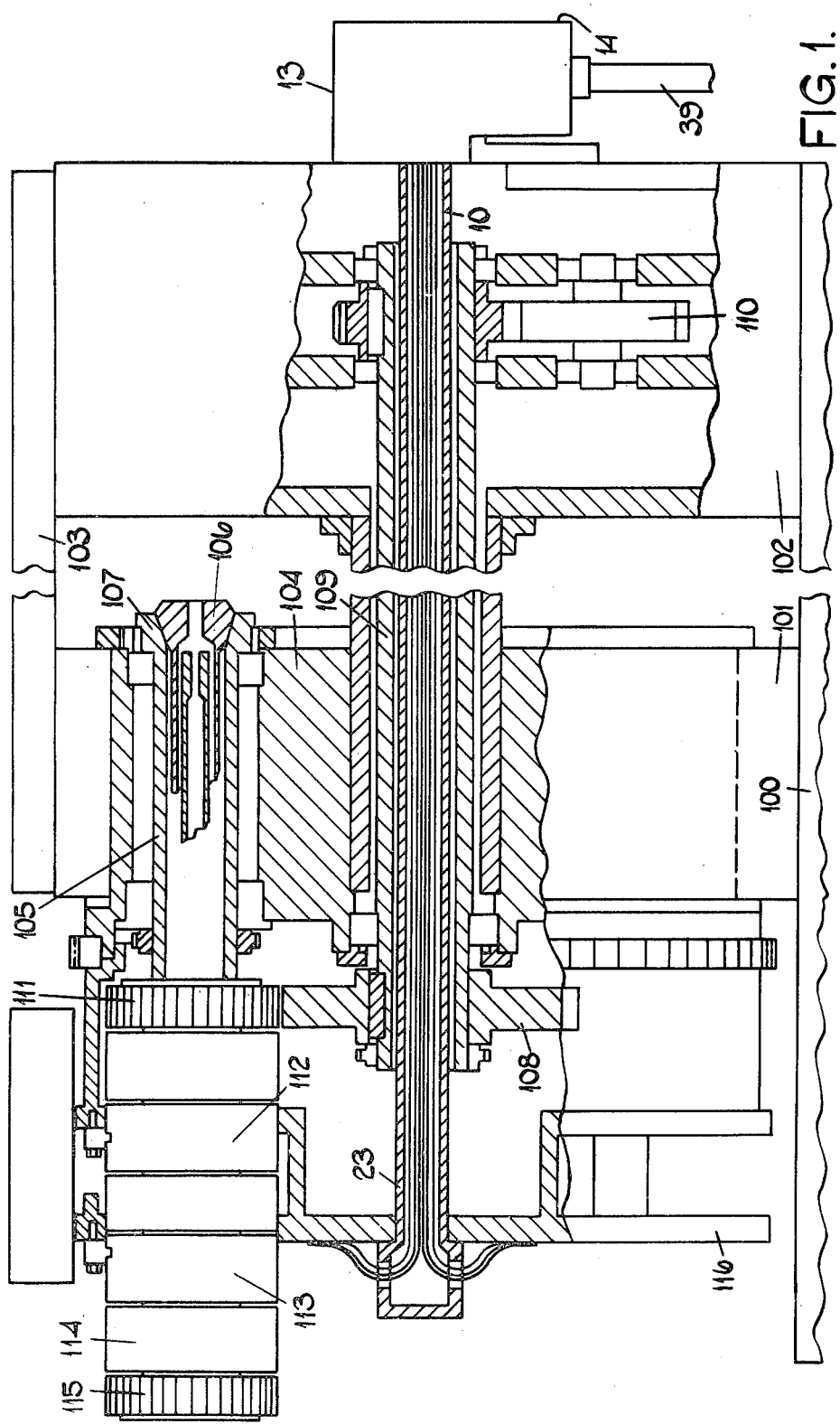

United States Patent [19]

Blockley et al.

[11] 4,158,319
[45] Jun. 19, 1979

[54] CONTROLS FOR MULTI-SPINDLE LATHES

[75] Inventors: Alec G. Blockley; Edmund A. McConnell, both of Coventry, England

[73] Assignee: Wickman Machine Tool Sales Limited, Coventry, England

[21] Appl. No.: 875,976

[22] Filed: Feb. 8, 1978

[30] Foreign Application Priority Data

Feb. 19, 1977 [GB] United Kingdom ............... 7108/77

[51] Int. Cl.² ........................ B23B 3/24; B23B 3/00
[52] U.S. Cl. ........................................... 82/3; 82/2 B
[58] Field of Search ................................... 82/3, 2 B

[56] References Cited

U.S. PATENT DOCUMENTS

| 3,828,901 | 8/1974 | Flueckiger | 82/3 |
| 4,011,777 | 3/1977 | McConnell | 82/3 |

FOREIGN PATENT DOCUMENTS

| 2457477 | 6/1975 | Fed. Rep. of Germany | 82/3 |
| 2656309 | 6/1977 | Fed. Rep. of Germany | 82/3 |

Primary Examiner—Harrison L. Hinson
Attorney, Agent, or Firm—Ladas, Parry, Von Gehr, Goldsmith & Deschamps

[57] ABSTRACT

A multi-spindle lathe having a multi position multiple rotary electrical switch associated with a drum in which the spindles are rotatably mounted, the drum and switch being indexable between a number of finite positions equal to the number of spindles, each spindle having clutch and brake units, the switch being arranged to control circuits to said units and the switch having fixed and rotatable parts carrying respective co-operable electrical contacts forming part of the circuits and also having at least two continuous conductor rings on one of the parts and contacts carried on the other of the parts engaging the conductor rings respectively, selection of any one of the possible indexed positions of the switch providing simultaneous connection between a number of said co-operable contacts and said contacts engaging the conductor rings being in contact therewith at all possible positions of the switch and control being provided for controlling electrical supply to the contacts and to the rings for selective actuation of the clutch and brake units.

10 Claims, 5 Drawing Figures

CONTROLS FOR MULTI-SPINDLE LATHES

This invention relates to controls for multi-spindle lathes of the kind having a drum in which is mounted a plurality of work spindles, the drum being indexable to bring successive spindles into position for machining operations to be carried out on work pieces held in chucks carried on the respective spindles.

On the drum and associated with the spindles there are various controls such as speed selection clutches, brakes, chuck actuators and other devices, at least some of which are electrically actuated. On large and complex lathes there may be a great many electrical devices to be operated and it may be necessary in particular to provide for several electrical devices to be electrically actuated or to be capable of actuation electrically, for each indexed position of the drum.

It has been known to provide a rotary electrical commutator for this purpose, on a multi spindle lathe but in such known commutators it is impractical to provide control for a large number of circuits, for reasons such as size limitations for the commutator.

It is the object of this invention to provide a multi-spindle lathe with convenient means for controlling multiple electrical connections to the spindle drum.

According to the invention a multi-spindle lathe characterised by a multi-position, multi-pole rotary electrical switch associated with a drum in which the spindles are rotatably mounted and which is indexable between a number of finite positions, the switch being arranged to control multiple electrical circuits to the drum, and the switch having a fixed part and a rotatable part rotatable relatively to the fixed part, said fixed part and said rotatable part respectively having equal numbers of co-operable electrical contacts thereon forming part of the electrical circuits respectively and also having at least two continuous conductor rings on one of the parts and contacts carried on the other of said parts engaging the conductor rings respectively, said rings and contacts forming part of further respective electrical circuits, and the fixed part being fixed relatively to a base of the lathe and the rotatable part being indexable with the drum, and selection of any one of the possible positions of the switch providing simultaneous connection between a number of said co-operable contacts and also the conductor rings being in contact with their contacts at all possible positions of the switch, and control being provided for controlling the electrical supply to the co-operable contacts and to the rings and their contacts in accordance with predetermined requirements.

Figure 2:
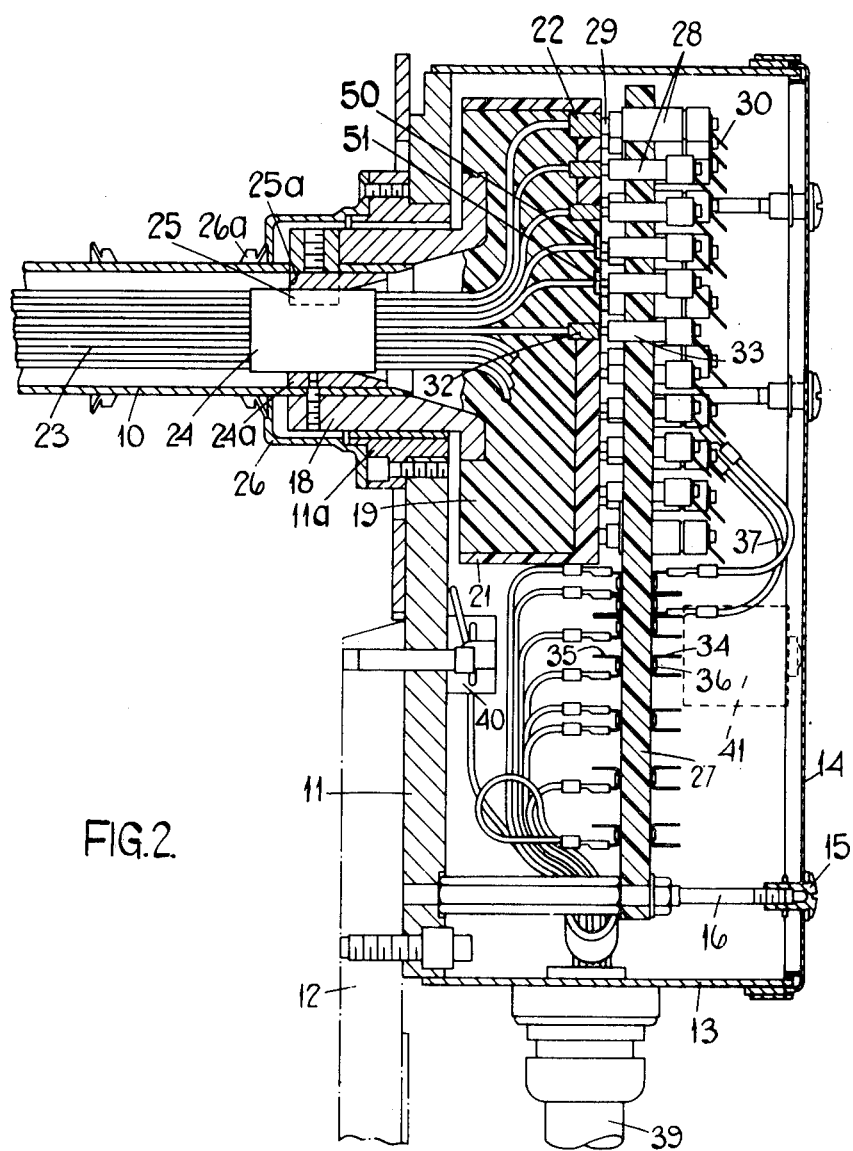
Figure 3:
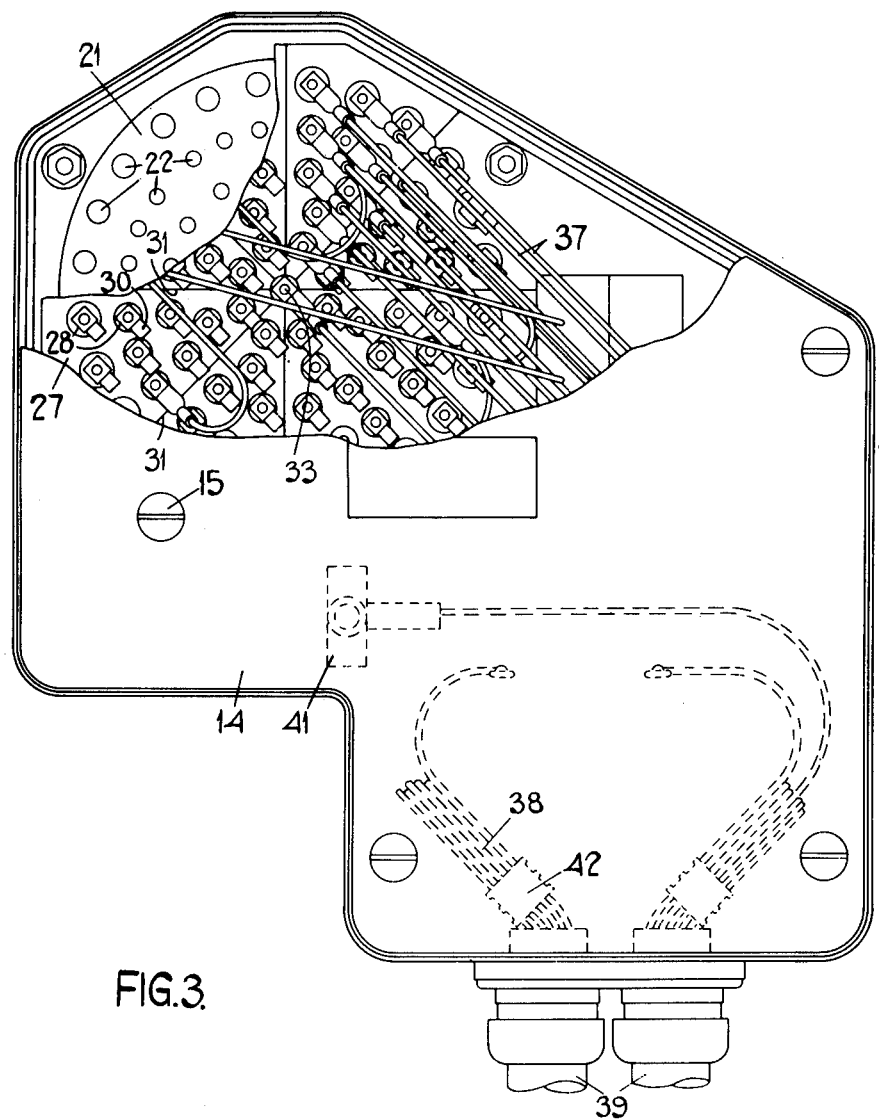
Figures 4, 5:
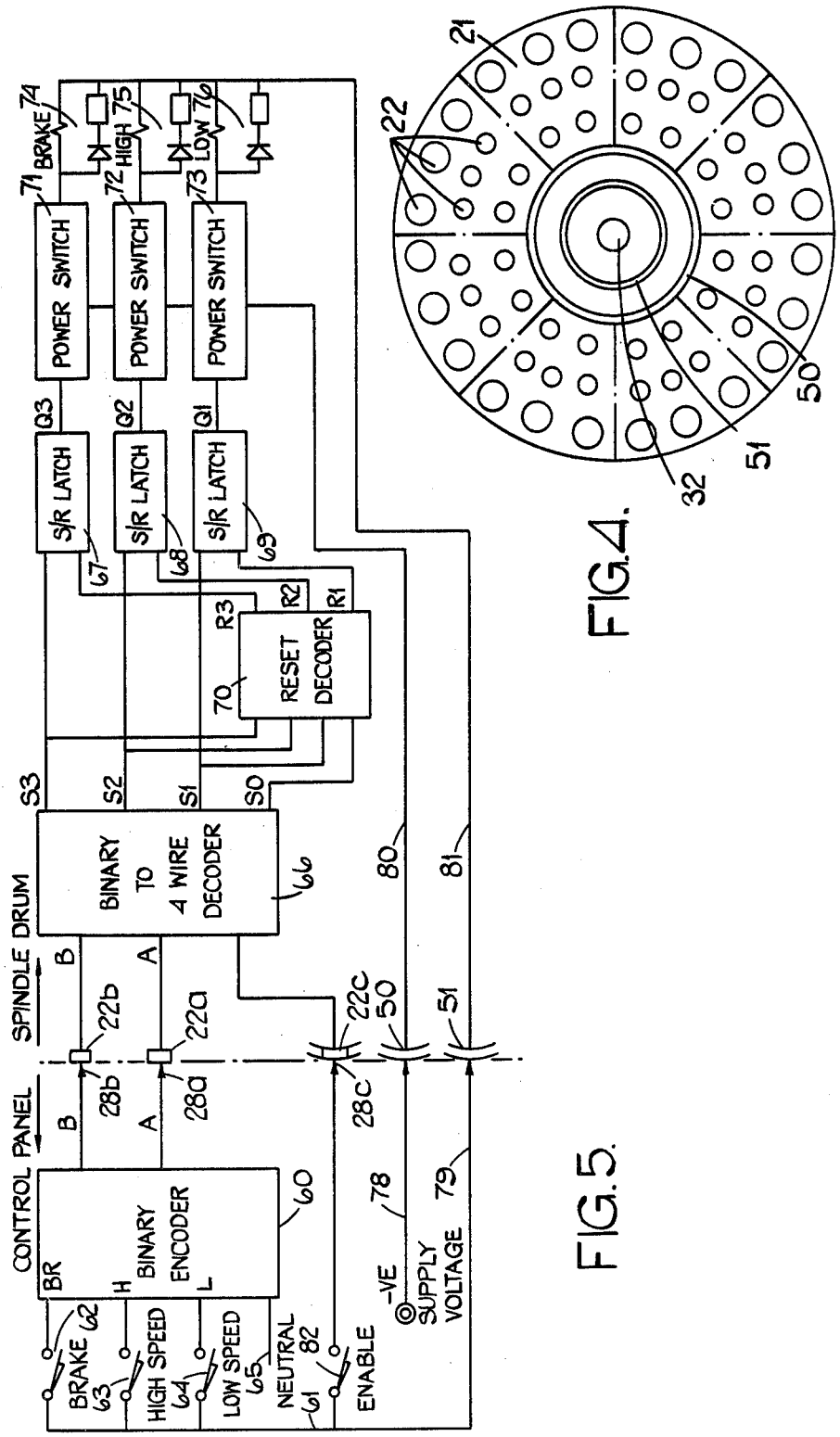

The invention will now be described by way of example, with reference to the accompanying drawings, in which:

FIG. 1 is a diagrammatic representation of a multi-spindle lathe constructed in accordance with the invention, FIG. 2 is a side elevation cross-sectional view of a rotary switch constructed in accordance with the invention and shown in the machine, FIG. 3 is a partly broken away end view of the switch, FIG. 4 is a view of the face of the rotatable part of the switch, and FIG. 5 is a circuit diagram showing the switching circuits for clutch and brake operation.

The multi-spindle lathe shown in FIG. 1 has a base 100. On this are two superstructures 101 and 102, joined by a bridge structure 103. One of these is a superstructure in the form of a drum housing 101 in which is indexably mounted, about a horizontal axis, a spindle drum 104. Journalled in the drum 104 are a plurality, in this case eight, work spindles 105 rotatable about parallel horizontal axes. Each includes a chuck having inner and outer parts 106, 107. For rotating the work spindles a gear 108 is journalled in the centre of the drum 104 on a tubular spindle 109 which extends co-axially right through the drum across the space between the two superstructures 101, 102 and into the superstructure 102. Within this is a gear train indicated generally at 110 for driving the spindle 109. The gear 108 meshes with respective gears 111 on each of the work spindles. However, the gear 111 on each such work spindle is engageable with its work spindle through an electro-magnetic clutch 112. Furthermore, an electro-magnetic brake 113 is provided on each work spindle to stop the spindle in the drum when required. There is on each work spindle a further clutch 114 which can engage the spindle to a further gear 115 for driving the spindle at an alternative speed. This gear 115, in turn, is driven by a further train of gears (not shown) connecting with the central hollow spindle 109. Partially enshrouding the clutches and brakes of the work spindles is an extension 116 secured to the drum 104.

Secured to the drum extension 116 is a tube 10 which passes through the hollow interior of the central spindle 109 to the opposite end of the lathe. The tube 10, which indexes with the drum 104, contains wiring indicated at 23, leading to the clutch and brake assemblies on the respective work spindles of the machine. Wiring within the tube 10 also leads to other electrically actuated or actuable devices on or associated with the spindles within the drum. Such a lathe is described and claimed in pending patent application No. 56565/73.

At the extremity of the tube 10 there is a rotary switch which is illustrated in FIGS. 2, 3 and 4 of the drawings. This has a composite housing comprising a base plate 11 secured to a fixed part 12 of the machine. Welded to the base plate 11 is a wall 13 of the housing, in which in turn is carried a detachable cover 14 of the housing. The cover is secured by hollow nuts 15 engaging the studs 16 which are fastened in the base plate 11.

The switch comprises two parts, a relatively rotatable part and a fixed part having respective sets of complimentary poles as will be described.

The rotatable part identified generally by numeral 21 is a composite assembly in which are secured a plurality of separate contacts or poles 22. These contacts are of electrically conducting material and they are embedded in electrically insulating material. The assembly comprises a metal flanged bush 18, a moulded resin case and an epoxy resin filler 19, the contacts 22 being moulded in the case of the part 21. The assembly is secured to the tube 10, the bore of the bush 18 fitting on the outer diameter of the tube 10. The bush 18 is keyed to the tube 10 by a cap 25 which fits into a slot 25a in the tube 10.

The contacts 22 are connected to the wiring 23 which extends into and through the hollow tube 10. The wiring is enclosed in a sleeve 24 which in turn is located in a bush 24a which ensures that the wires do not flex in the hollow tube.

FIG. 4 shows the face of the rotatable part 21 presented towards the fixed part. It can be regarded as having eight segments which correspond with the eight spindles of the machine. These segments are shown in the figure, by dividing lines.

There are sixty-four contacts 22 formed in a plurality of circular rows. In this example there are three such rows. The outermost row has three contacts in each segment. The next row also has three contacts in each segment and the inner row has two in each segment. The contacts in the outer row are rather larger than those in the other two rows and carry higher current. They carry power supplies to an electric motor for spindle location adjustment, in this example. The other contacts 22 carry electrical signals, as will be described.

Within the inner row of contacts 22 are two concentric continuous rings 50, 51 and in the centre there is a single contact 32. The two rings 50, 51 which are of electrically conducting material, like the contacts 22, are embedded in the case of the part 21. They are, furthermore, connected by wiring through the hollow tube 10 to the the outer end of the machine.

In this example, the ring 50 provides power to actuate the clutch and brake units on the respective spindles of the machine and ring 51 is for the return part of the power circuit.

The rotatable part 21 of the switch is supported by a bearing sleeve 11a surrounding the bush 18 and which is secured to the base plate 11 of the housing. A cover 26 with a seal 26a is fixed to the bearing sleeve to prevent ingress of foreign matter and oil to the assembly.

The fixed part of the switch is supported on the studs 16, which also serve to engage the nuts 15 for the detachable cover 14. The fixed part is in the form of a plate 27 formed from an electrically insulating material. This plate carries a plurality of spring loaded brushes 28. Each such brush has a tubular mounting secured in the plate 27 and, extending out of one end, a spring loaded brush proper 29. The other end of the brush carries a terminal tag 30.

There are the same number of brushes 28 as contacts 22 and there are further brushes 28 to contact the two rings 50, 51. There may be more than one brush contacting each of the rings 50, 51 and this will depend upon the area of contact required to transmit the power through them. In any of the predetermined possible angular indexed positions of the switch, corresponding with indexed positions of the spindle drum of the machine, all contacts 22 co-operate with their corresponding brushes 28. The brushes 28 for the rings are of course in electrical contact therewith all the time.

The plate 27 is not circular but corresponds approximately in shape to that of the housing, but the area in which the brushes 28 are fitted corresponds with the rotatable part of the switch and this area is, in consequence, circular. Lines 31 on the face of the plate 27 remote from the rotatable part indicate the zones represented by each of the segments. In this construction there are the eight identical segments, as there are eight spindles in the machine. Thus in each segment, the rotatable part of the switch, through the associated wiring 23, can be used to actuate mechanisms associated with each spindle, whilst the fixed part and its brushes provide for the choice of said mechanisms that may be engaged at the position corresponding to each particular segment. A further brush 23 is situated in the centre of the assembly to engage the centre contact 32. This provides a common feed for some of the circuits through the contacts 22.

The plate 27 has, at a position offset from the area containing the brushes 28, a connector portion having a plurality of connector tabs 34, 35 connected in pairs through rivets 36 to opposite sides of the plate 27 respectively. To the tabs 34 may be connected wires 37 which, in turn, connect with respective tabs 30 on the brushes 28. Thus by connecting appropriate brushes 28 to particular tabs 30, a choice of spindle functions may be programmed.

The tabs 35 are connected to wiring 38 from an input conduit 39 entering the side wall 13 of the casing. The wiring 38 is connected with a control unit (not shown) which provides control of the supply of power to the various mechanisms but which, in addition, provides for signals to be transmitted when required.

It has already been explained that the rings 50, 51 provide power and return to the clutch and brake mechanisms 112, 113 and 114 on each of the spindles. By means of these rings, these power circuits are always operatively connected through the switch. However, the inner row of contacts 22 are provided for selecting clutch or brake on each spindle. A signal for selecting neutral may be provided also by one of the contacts in the next row of contacts. In neutral neither clutch nor brake are operative. In an alternative arrangement, neutral condition may be signalled by absence of any signals.

As shown in FIG. 5 electrical controls for clutch and brake actuation is provided by a series of electronic devices, one associated with each of the work spindles of the lathe.

In each segment of contacts 22 the inner pair of contacts carry signals for the control of the clutches and brake on each spindle. In FIG. 5 these contacts 22 are identified as 22a and 22b respectively. Co-operating with these are respective brushes 28a and 28b. These two brushes 28a, 28b are connected with a control panel including a binary encoder 60. The electrical input to this is provided by a line 61 which, however, has three parallel switches 62, 63 and 64 marked brake, high speed clutch and low speed clutch. In the encoder 60 there is also a neutral state indicated at 65 which, however, is not connected to any input.

The encoder is thus capable of receiving any one of four input states from the line 61. It produces, however, output signals in two lines connected with the brushes 28a, 28b. A first signal is for brake actuation and is initiated by closing the switch 62 only the encoder producing signals to brushes 28a and 28b. The high speed clutch signal is initiated by closing the switch 63 only and this produces a signal to the brush 28b only. When low speed clutch is initiated by closing the switch 64, the encoder produces signals to the brushes 28a only. For neutral selection, there is no signal to either of the brushes 28a, 28b.

The appropriate signals are transmitted through the contacts 22a, 22b to a device on the spindle drum. There is one such device for each work spindle. This device comprises a binary decoder 66. This is only actuated when an enable switch 82 is closed, which transmits a signal through one of the contacts 22c and associated brush 28c in each segment from the line 61. The enable signal ensures that the decoder is not sensitive to changes during indexing.

The decoder receives the four types of signals described, from the encoder 60. It produces four output signals through respective lines S3, S2, S1, S0. Three latches 67, 68 and 69 receive the signals S3, S2 and S1 respectively and produce outputs Q3, Q2 and Q1. A reset decoder 70 receiving all four signals S3, S2, S1 and S0 from the decoder 66 transmits reset signals R3, R2 and R1 to the respective latches 67, 68, 69.

Having thus achieved respective outputs Q3, Q2, Q1, these are fed to the brake, high speed and low speed clutches through respective power switches 71, 72, 73. Solenoids for the brake and clutches are indicated in FIG. 5 at 74, 75, 76. The power for operating the respective solenoids of the brake and the clutches comes directly from the power supply through the rings 50, 51 and brushes 28 and is continuously available. The power supply lines are shown in FIG. 5 at 78, 79 and 80, 81. The line 80 leads to the power switches and the line 81 leads directly to the solenoids of the brake and high and low speeds clutches. This arrangement ensures that the clutch or brake remains operative during indexing of the drum, and is only changed when a contact 22 comes to a new position in which a different signal or combination of signals is transmitted.

The advantages of retaining power supplies to the clutch and brake units during indexing are that, in the case of the clutch units, there is no deceleration of the spindle which must otherwise, after indexing, be restored, thus saving both wear and additional power consumption.

In the case of the brake unit, the spindles will remain in selected angular positions between indexing, when required, to obviate the need for adjustment for successive accurate cross drilling or other such operation requiring the work piece to remain stationary.

During indexing, the electrical supplies to all the separate contacts 22 must be discontinued. Not only is this necessary to prevent arcing, but also to prevent malfunctioning. Since each group of contacts in each segment include more than one contact in each circumferential or circular row, switching off before indexing is necessary to prevent an energised contact or brush engaging another which is connected to a mechanism or switch serving another function.

The casing of the rotary switch also serves as a carrier for additional electrical contacts on a block 40 leading to a safety interlock switch 41, the input also reaching this switch through the input conduit 39.

The switch 41 within the casing is of the plunger type and is attached to the wall 13 thereof, the plunger engaging with the detachable cover 14. When the latter is removed, the switch 41 is opened, thus isolating electrical supply from the rotary switch and preventing operation of the machine.

The input conduit 39 is divided as shown in FIG. 2 and the bunches of wires which enter the casing are clamped by means of clamps 42.

By means of the apparatus shown, a plurality of functions can be controlled in each indexed position of the machine and special functions, such as selection of particular angular setting of a single spindle, can be achieved while other functions are being carried out on others of the spindles.

In an alternative construction, the number of contacts 22 and corresponding brushes 28 to engage them is different to that shown, being either a smaller or a larger number. Additional continuous rings may also be provided for further functions. Other combinations are possible, but in all cases the separate contacts are all simultaneously connected with respective brushes at predetermined finite angular positions of the switch and the rings are continuous. Since the rotatable part of the switch is connected to the spindle drum, it is not possible for the switch to occupy a position intermediate one of the predetermined finite positions.

In a further alternative construction tabs 34 and 35 are omitted and brushes 28 and 33 may be connected directly to an external control box where the spindle functions can be selected by switches, dials or other devices.

In a further alternative construction the rings 50, 51 are on the external cylindrical surface of the rotatable part 21. Brushes 28 are correspondingly provided on the fixed part to act on these rings. This enables additional contacts 22 to be provided, with associated brushes 28, in the space occupied by the rings 50, 51 in the construction illustrated. Such additional contacts may be for such devices as profiling template index error shift decoding devices used when hydraulic copiers are in use.

We claim:

1. A multi-spindle lathe comprising a base, a drum mounted on the base, a plurality of spindles rotatably mounted in the drum, the drum being indexable between a number of finite positions, a multi pole rotary electrical switch associated with the drum, multiple electrical circuits to the drum arranged to be controlled by said multi pole rotary electrical switch, a rotatable part and a fixed part of the switch, equal numbers of co-operable electrical contacts on the rotatable and fixed parts of the switch respectively, electrical circuits of which the electrical contacts form part, at least two continuous conductor rings one one of the parts engaging the conductor rings respectively, further respective electrical circuits of which the rings and contacts form part, the fixed part being fixed relatively to the base of the lathe and the rotatable part being indexable with the drum, selection of any one of the possible positions of the switch providing simultaneous connection between a number of said co-operable contacts and also the conductor rings being in contact with their contacts at all possible positions of the switch, and control being provided for controlling the electrical supply to the co-operable contacts and to the rings and their contacts in accordance with predetermined requirements.

2. A lathe as claimed in claim 1 in which the clutch and brake units associated with respective spindles are arranged to be actuated through respective ones of said electrical circuits.

3. A lathe as claimed in claim 1 in which the co-operable electrical contacts on the fixed and rotatable parts respectively are arranged in circumferential rows, the contacts in at least one circumferential row being spaced apart angularly with respect to the axis of relative rotation between the parts, by an angle less than that through which the drum is indexable.

4. A multi-spindle lathe comprising a base, a drum rotatably mounted on the base, a plurality of spindles rotatably mounted in the drum, clutch and brake units associated with the respective spindles, the drum being indexable between a number of positions, a multi pole rotary electrical switch, multiple electrical circuits to the drum being controlled through said switch, a fixed and a rotatable part of the switch, equal numbers of co-operable electrical contacts on the parts of the switch, electrical circuits of which the electrical contacts form part, at least two continuous conductor rings on one of the parts, contacts carried on the other of said parts engaging the conductor rings respectively, further electrical circuits of which the rings and contacts form part, the fixed part of the switch being fixed relatively to the base of the lathe and the rotatable part being indexable with the drum, selection of any one of the possible positions of the switch providing simultaneous connection between a number of said co-operable contacts and also the conductor rings being in contact with their contacts at all possible positions of the switch, a pair of said co-operable contacts forming part of the respective circuits controlling clutch and brake units associated with a respective spindle, the circuits connected to each of such pair of said co-operable contacts including an encoder and a decoder, said encoder and decoder providing signals for actuating the clutch and brake units selectively.

5. A lathe as claimed in claim 4, in which the decoder is on the rotatable part and receives respective selected signals to actuate respective power switches for the clutch and brake units respectively, the power switches being in an electrical power supply circuit formed by the conductor rings, and clutch or brake unit.

6. A lathe as claimed in claim 4, in which the decoder is on the rotatable part and receives respective selected signals to actuate respective power switches for the clutch and brake units respectively, the power switches receiving electrical power supplies the conductor rings and releasable latches controlling the respective power switches, and circuits associated with the latches to reset them after transmission of an appropriate signal.

7. A lathe as claimed in claim 4 in which there is a further circuit in which one of said co-operable contacts is included which must be completed before reception of a signal in the decoder can actuate a circuit controlling a clutch or brake unit.

8. A lathe as claimed in claim 1 in which the contacts on the fixed part are connected to respective circuits on the lathe base through disconnectible connections allowing alteration of their connection with the circuits.

9. A lathe as claimed in claim 1 in which one of said parts of the switch has an axially presented surface on which the contacts and conductor rings are provided, the other of said parts having an opposite axially presented surface on which the co-operating contacts are provided.

10. A lathe as claimed in claim 1 in which the conductor rings are disposed within a space occupied by said co-operable contacts.

* * * * *